United States Patent [19]

Nuñes et al.

[11] 4,079,645
[45] Mar. 21, 1978

[54] APPARATUS FOR STACKING WINDOWS WITH SEPARATOR LAYERS THEREBETWEEN

[75] Inventors: Emmanuel Nuñes, Bellerive par Cambronne les Ribecourt; Jacques Vervin, Thourotte, both of France

[73] Assignee: Saint-Gobain Industries, Neuilly-sur-Seine, France

[21] Appl. No.: 659,627

[22] Filed: Feb. 20, 1976

[51] Int. Cl.² .............................................. B65G 57/04
[52] U.S. Cl. .......................................... 83/92; 53/157; 83/277; 93/93 D; 214/6 M; 271/9
[58] Field of Search .............. 214/6 M, 6 FS, 6 DS; 271/9, 85, 194, 227, 261; 226/118; 83/177, 437, 92, 277; 93/93 D; 53/157; 209/80, 82

[56] References Cited

U.S. PATENT DOCUMENTS

| 2,413,553 | 12/1946 | Evers | 271/194 X |
| 2,524,846 | 10/1950 | Socke et al. | 214/6 FS X |
| 2,837,016 | 6/1958 | Jezierski | 93/93 D |
| 3,031,906 | 5/1962 | Holman | 214/6 FS X |
| 3,431,698 | 3/1969 | Bathellier | 214/6 M X |
| 3,471,036 | 10/1969 | Thomas et al. | 214/6 M X |
| 3,517,831 | 6/1970 | Hahn | 214/6 M X |
| 3,776,441 | 12/1973 | Forthmann et al. | 226/118 X |
| 3,845,950 | 11/1974 | Kuzniak | 271/194 |
| 3,848,757 | 11/1974 | Jordan | 214/6 DS X |

FOREIGN PATENT DOCUMENTS 1,156,926   7/1969   United Kingdom.

*Primary Examiner*—L. J. Paperner

[57] ABSTRACT

Reciprocally displaceable window gripping means such as a suction device grips windows successively at a first position and deposits them in a stack at a second position. Nipper means reciprocally displaceable with the gripping means grips the free end of a strip of separator material, such as paper or the like, at the second position and pulls the strip over a stacked window during the return to the first position. Severing means severs the portion of the strip over the stack from a strip supply and the nipper means releases to deposit the severed portion on the stacked window. Preferably the gripping means and nipper means are mounted on a carriage. Windows may be successively delivered by a conveyor and centering and arresting means are provided. Roll supply driving and path lengthening means are described.

9 Claims, 3 Drawing Figures

APPARATUS FOR STACKING WINDOWS WITH SEPARATOR LAYERS THEREBETWEEN

The present invention relates to apparatus for automatically and successively stacking windows with layers of separator material therebetween such as paper or the like. The apparatus is especially useful for stacking curved automobile windows, but can be used for stacking other types of windows.

Windows which are designed for use in automobiles are generally tempered in a unit comprising a reheating furnace at the output of which blast pipes are situated. The windows are conveyed to this unit and removed therefrom on roller conveyors. After tempering, the windows are washed, dried and then checked in an automatic unit. A conveyor then transports the checked articles to a stacking station. At the stacking station the windows are placed in vertical piles with intermediate sheets of paper inserted therebetween. Each sheet of paper is inserted between the adjacent sheets of glass. The stacks thus produced are then placed vertically in packing cases and sent to the users.

These stacking operations are commonly performed manually and generally require several workers whose work is monotonous and tiresome. Furthermore, the manual labor is expensive.

The object of the present invention is to obviate these disadvantages by providing apparatus for automatically carrying out the stacking operations.

Apparatus according to the invention comprises window gripping means reciprocally displaceable between first and second positions for gripping windows successively at the first position and depositing them in a stack at the second position. Means adjacent the second position presents the free end of a strip of paper or the like from a supply thereof, advantageously a roll. Nipper means reciprocally displaceable with the window gripping means grips the free end of the strip when the gripping means is at the second position and pulls the strip over a stacked window during return of the gripping means to the first position. Severing means then severs the portion of the strip over the stack from the strip supply and the nipper means is released to deposit the severed portion on the stacked window. The operation then repeats.

Advantageously the window gripping means and the nipper means are mounted on a carriage which is reciprocally displaceable between the first and second positions. Also, preferably windows are delivered successively to the window gripping means by a conveyor, and the windows are stacked on a pallet supported on a vertically movable platform.

Thus the apparatus of the invention carries out a cycle of operations, the nipper means gripping the free end of the strip of paper when the gripping means deposits a window on the stack and accompanying the gripping means when it returns to grip a second window, thereby pulling the strip of paper directly over the stack of windows. The strip is then cut by the severing means and released by the nippers so that the cut portion is deposited on the stack of windows and forms an intermediate layer. In the meantime, the gripping means grips a succeeding window and moves to deposit it on the intermediate paper layer, which is at the top of the stack, and a new cycle begins.

The gripping means advantageously comprises a suction pipe communicating with a chamber equipped with a suction fan, and the chamber has a valve-controlled outlet to the atmosphere. Thus, by actuating the valve, suction can be developed and removed.

Means for centering the windows are preferably provided on the conveyor on which they are transported, upstream of the gripping position. These means may comprise, for example, two centering guide bars disposed parallel to the path of travel of the conveyor and operated by jacks which are controlled by a detection means, for example, a photoelectric cell which is sensitive to the passage of a window and located upstream of the guide bars.

Two additional detectors are advantageously provided in the region of the gripping position. They are advantageously positioned so that they simultaneously detect the presence of a window, one detecting the leading edge and the other detecting the trailing edge thereof, and control the lowering of an abutment which arrests the movement of the window. In the case of a broken window, when its leading edge intersects the beam emitted by the second detector, its trailing edge will no longer be simultaneously detected by the first detector. Thus the abutment is not lowered and the broken window continues to be conveyed until it is rejected.

Other objects, features and advantages of the present invention will be apparent from the following description of a preferred embodiment thereof, taken in conjunction with the accompanying drawings, in which.

Figure 1:
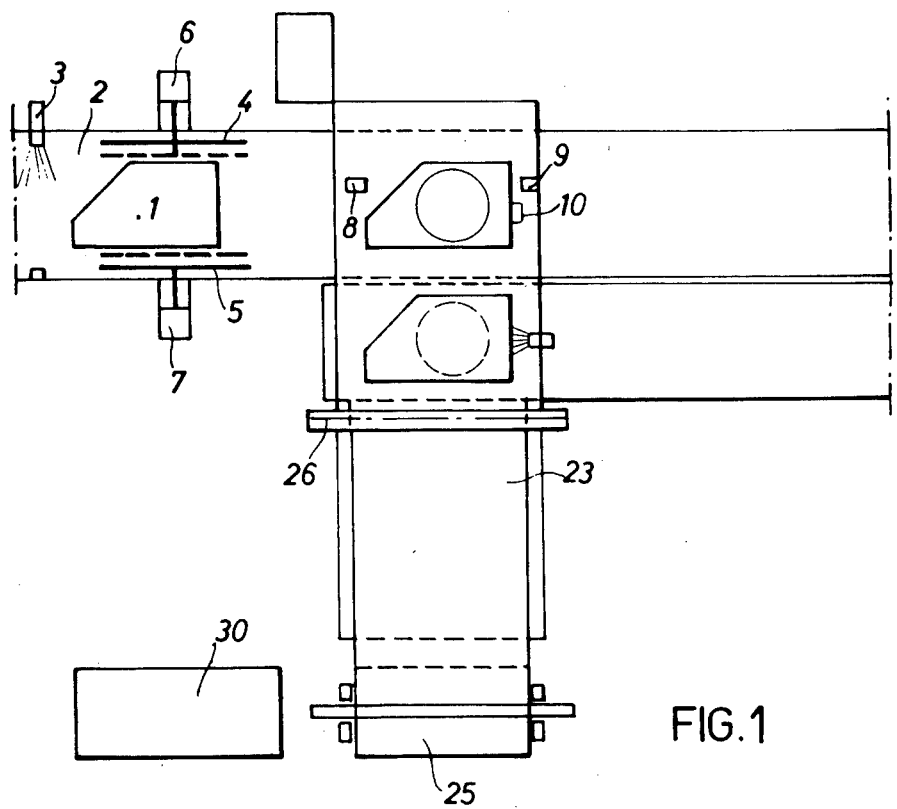
FIG. 1 is a diagrammatic plan view of the complete apparatus.

Referring to FIG. 1, the windows 1 are conveyed on a continuous conveyor 2 and pass in front of a detector 3 which controls the movement of two centering guide bars 4 and 5 operated by jacks 6 and 7. The jacks may be, for example, hydraulic piston-cylinder devices. The guide bar 4 is first moved inward from the edge of the conveyor 2 by jack 6 and then, after a short period of time, the guide bar 5 is moved inward by the jack 7. Thus, transported by the conveyor 2 and centered by the guide bars 4 and 5, the window 1 moves in front of a first detector 8. A second detector 9 is disposed downstream of the detector 8 at a distance such that it detects the leading edge of the window 1 while the detector 8 detects the trailing edge thereof. The simultaneous actuation of the two detectors causes a displaceable abutment 10 to be placed in position in the path of travel of the window, and the window comes to rest against this abutment. If a fragment of a broken window moves in front of the detectors, its leading end will actuate the detector 9 whereas the detector 8 will not be actuated. The abutment 10 will thus not be set in position and the window transported by the conveyor 2 will be directed to a rejection station.

Figure 2:
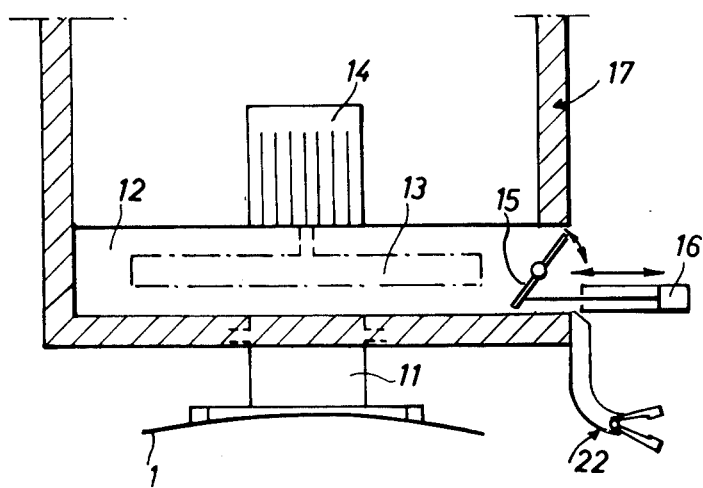
FIG. 2 is a detailed view, on a larger scale, of the suction device for gripping the windows.

The window 1 is arrested by the abutment 10 beneath a gripping device which is shown in detail in FIG. 2. This gripping device essentially comprises a suction pipe 11 communicating with a chamber 12 in which a fan 13 is rotated by a motor 14. A valve 15, controlled by a jack 16, enables the chamber 12 to be connected to the atmosphere in order to take in air through the pipe 11. Thus when valve 15 is closed, suction is produced in pipe 11, and when it is opened the suction is removed. The lower opening in the shaft 11 comprises a lip (not shown in detail) consisting of a flexible material and including a slit for communicating with the atmosphere. This lip is spaced at a distance from the plane of the window to be gripped such that, when suction is produced in the pipe 11, the window is lifted from the conveyor and held against the pipe. The distance may be, for example, about 50 mm.

Figure 3:
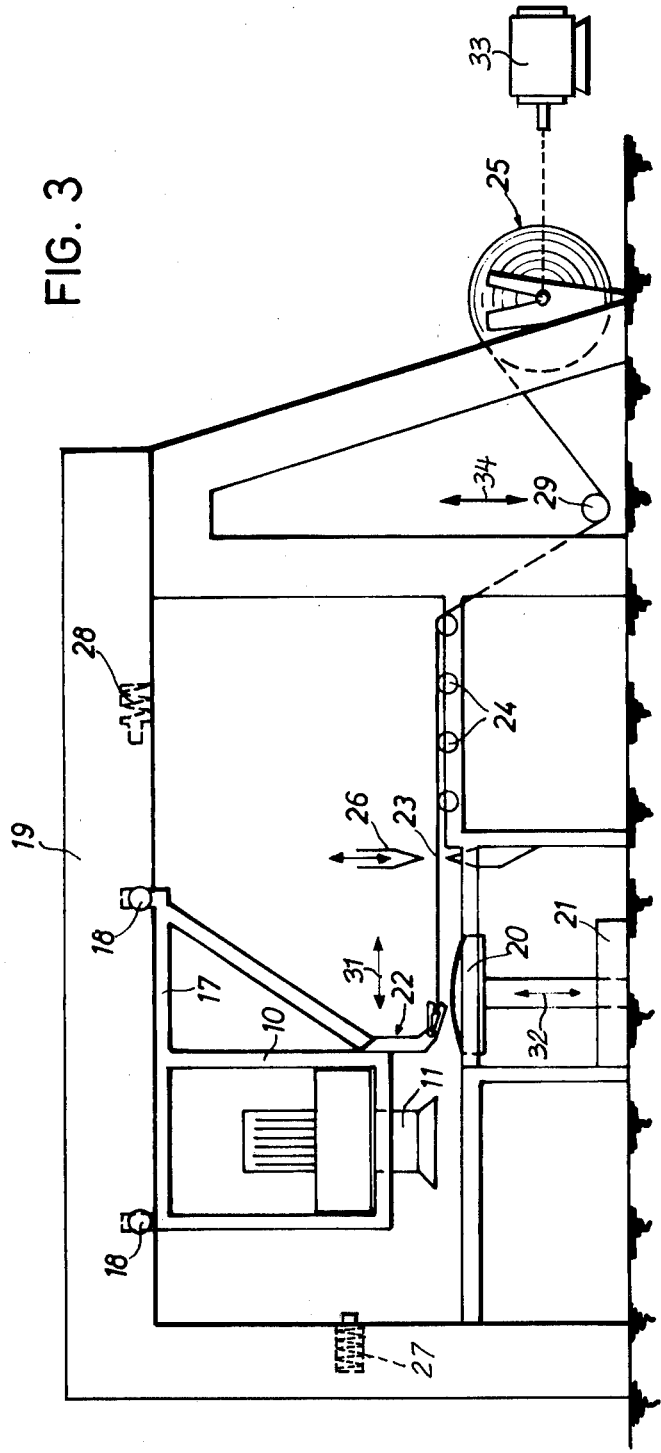
FIG. 3 is a diagrammatic elevational view of the stacking portion of the apparatus.

Referring to FIG. 3, a carriage 17 supports the gripping device 11. The carriage is mounted for longitudinal reciprocal displacement as shown by arrow 31, on rollers 18 which roll on the rails of a support frame or gantry 19 between an abutment 27 and an abutment 28. Suitable drive means (not shown) are provided.

When carriage 17 is in its left position against abutment 27, the suction gripping device 11 is actuated to lift a window from the conveyor 2 (FIG. 1). As explained above, the window will have been aligned with device 11 with respect to the path of travel of the conveyor by the centering means 4–7. The window will also have been aligned with device 11 with respect to the reciprocal path of travel of the device by the arresting means 8–10. The carriage 17 is then displaced to the right, carrying the window with it.

When the carriage 17 is in abutment with 28, the window is aligned with a loading pallet 20. This is supported by a platform 21 mounted on a flanged chain which is adapted to be lowered vertically, as indicated by arrow 32. The suction action in pipe 11 is then discontinued and the window 1, which is no longer held in place by suction, falls onto the top of the stack where an intermediate layer of paper has been placed in position in the manner now to be described.

Articulated nippers 22, the opening and closing operations of which are controlled in sequence by a compressed air jack or other suitable means, are mounted on the carriage 17. The nippers may be actuated to their open position by suction in chamber 12 (FIG. 2) and to their closed position when the suction is released, or separate means synchronized with the carriage position may be provided.

The disposition of the nippers with respect to the carriage is such that they are adapted to grip the free end of a strip of paper 23 resting on the rollers 24 and being unrolled from a roll 25, when the suction pipe 11 is aligned with the pallet 20. When the carriage 17 is moved to the left in order to bring the gripping device into alignment with another window 1 retained by the abutment 10, the nippers 22 move therewith and draw along the strip of paper 23. When the window gripping device reaches its left position in which a fresh window is gripped by suction, severing means, here shown as a guillotine 26, cuts the strip of paper 23 and the end of the same is simultaneously released by the nippers 22. The severed portion of paper falls onto the window at the top of the stack and, when the carriage 17 brings the gripping device back into alignment with the pallet 20 and drops another window thereon, the nippers again grip the free end of the strip 23 in readiness for the subsequent operating cycle.

The paper which is commonly employed has a low tensile strength. As a result, any rapid pulling action exerted on the paper while it is being unrolled from the roll 25 might tear the paper. This disadvantage is obviated according to the invention by equipping the roll 25 with a drive device 33 which acts on its axis, and by providing a length of unwound paper through the action of a bar 29 which is movably mounted as indicated by arrow 34. In the position shown, bar 29 lengthens the path of travel of the strip from roll 25 to guillotine 26.

When the nippers 22 grip the free end of strip 22, bar 29 moves upward to release the strip during the pulling thereof over the stack. The drive system continues to act on the roller 25 for a predetermined period of time after the guillotine 26 has cut the strip 23 while the bar 29 returns to its lower starting position. A new length of unwound paper is thus obtained.

After a specific number of windows have been stacked on a pallet 20, a counter causes the pallet to be lowered until a photoelectric cell (not shown), excited by the absence of windows in its field, arrests the lowering movement. In practice, this lowering movement is carried out every seven or eight cycles. If the pallet 20 were lowered to far there would be a risk of the paper layer shifting its position as it fell, and of being incorrectly positioned on the stacked window to be protected. When the pallet 20 has been lowered by a distance corresponding to the height of a complete stack, it is automatically transported on a roller conveyor to a final station where it is taken up by a lifting carriage.

Suitable synchronization and control of the various elements may be provided as required, such as an electrical control unit indicated at 30, It will be apparent that the apparatus which has been described renders completely automatic the operations of handling and stacking windows with intermediate separator layers therebetween.

Various modifications may be made to the apparatus without departing from the scope of the claims. For example, for reasons of economy, the strip of paper 23 can be replaced by a specific number of narrow strips, possibly consisting of plastic material, which are unrolled in parallel. In this case, the nippers 22 will advantageously be replaced by a corresponding number of nippers located side by side opposite each of the strips.

We claim:

1. Apparatus for stacking windows with a layer of separator material therebetween such as paper or the like which comprises window gripping means reciprocally displaceable between first and second positions for gripping windows successively at the first position and depositing them in a stack at the second position, means for delivering windows successively to said first position, means for arresting movement of a window when the window is in position to be gripped by said window gripping means, said arresting means including leading and trailing edge detectors and displaceable abutment means controlled by the detectors for arresting movement of the window, means adjacent said second position for presenting the free end of a strip of said separator material from a supply thereof, nipper means reciprocally displaceable with said window gripping means for gripping said free end of the strip when the gripping means is at said second position and pulling the strip over a stacked window during return of the gripping means to the first position, and means for severing the portion of the strip over the stack from the strip supply and releasing the nipper means to deposit the severed portion on the stacked window.

2. Apparatus according to claim 1 in which said window gripping means and said nipper means are mounted on a carriage which is reciprocally displaceable between said first and second positions.

3. Apparatus according to claim 2 in which said severing and releasing of the nipper means is produced when said carriage returns to the first position thereof.

4. Apparatus according to claim 1 in which said window gripping means includes a suction pipe communicating with a chamber, a suction fan in said chamber, and a valve-controlled outlet from said chamber to the atmosphere.

5. Apparatus according to claim 1 wherein said window delivery means includes conveyor means for delivering windows successively to said window gripping means, said apparatus further including centering means for centering the windows on the conveyor means in alignment with the window gripping means with respect to the path of travel of the conveyor means.

6. Apparatus according to claim 5 wherein said arresting means arrests movement of a window on said conveyor means when the window is in alignment with the window gripping means with respect to the reciprocal path of travel of the window gripping means.

7. Apparatus according to claim 1 in which said strip supply is a roll, and including drive means for driving said roll between successive severings of portions of the strip.

8. Apparatus according to claim 7 including a movable bar in the path of travel of the strip from the roll to the severing means for lengthening the path of travel of the strip between a severing and the next pulling of the strip by said nipper means and releasing the strip during the pulling thereof.

9. Apparatus according to claim 1 including a vertically movable platform at said second position for supporting a pallet on which said windows are stacked.

* * * * *